Figure 1:
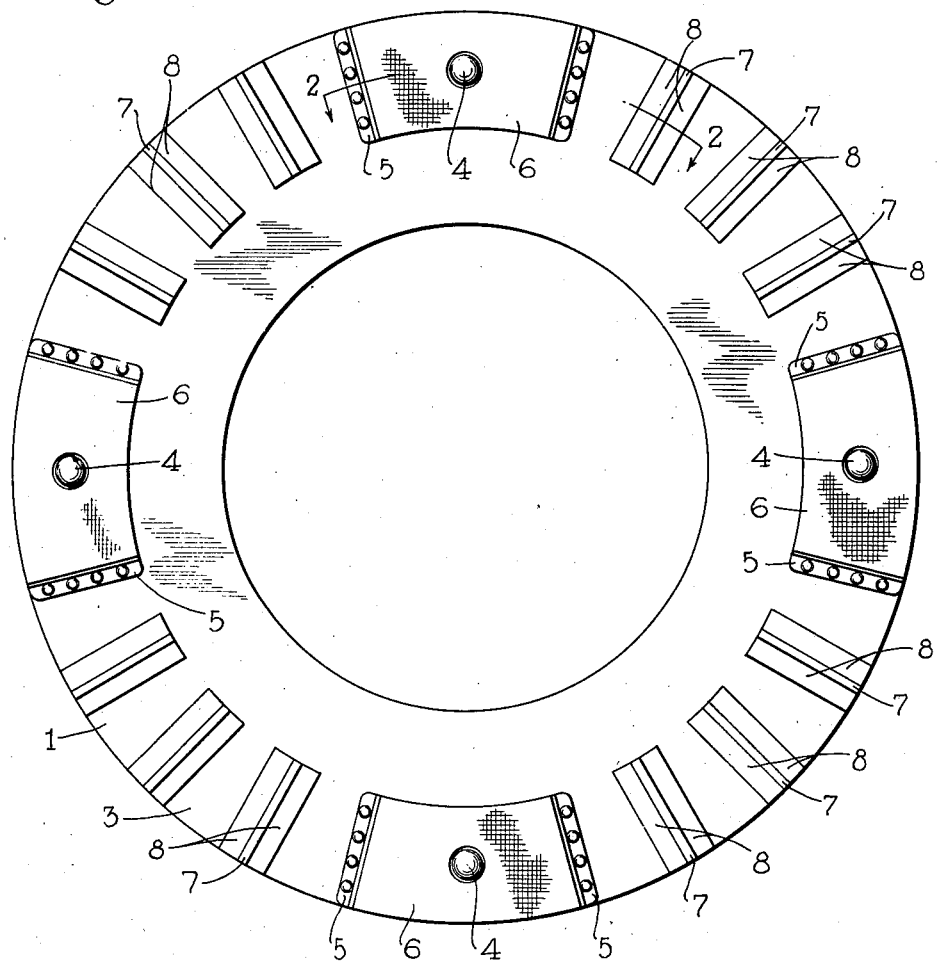

Aug. 17 1943.  J. C. McCUNE  2,326,961
BRAKE MECHANISM
Filed Dec. 20, 1941  3 Sheets-Sheet 1

INVENTOR
Joseph C. McCune
BY
ATTORNEY

Aug. 17 1943.    J. C. McCUNE    2,326,961
BRAKE MECHANISM
Filed Dec. 20, 1941    3 Sheets-Sheet 2

INVENTOR
Joseph C. McCune
BY
ATTORNEY

Aug. 17 1943.                J. C. McCUNE                 2,326,961
                             BRAKE MECHANISM
                         Filed Dec. 20, 1941            3 Sheets-Sheet 3
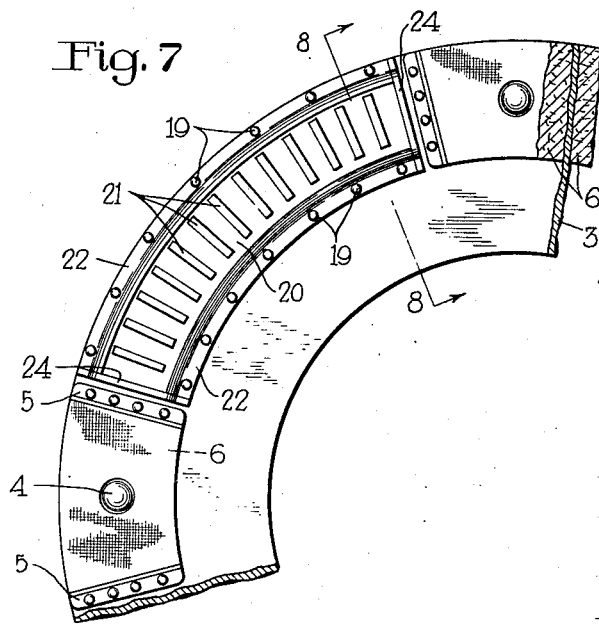
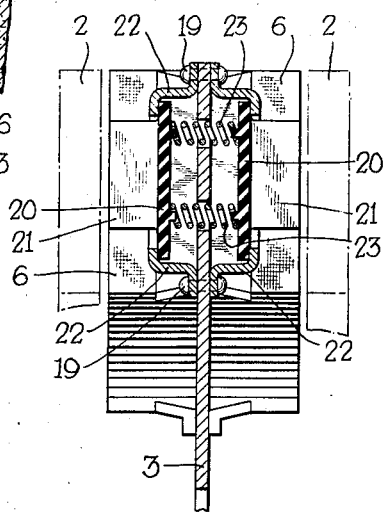
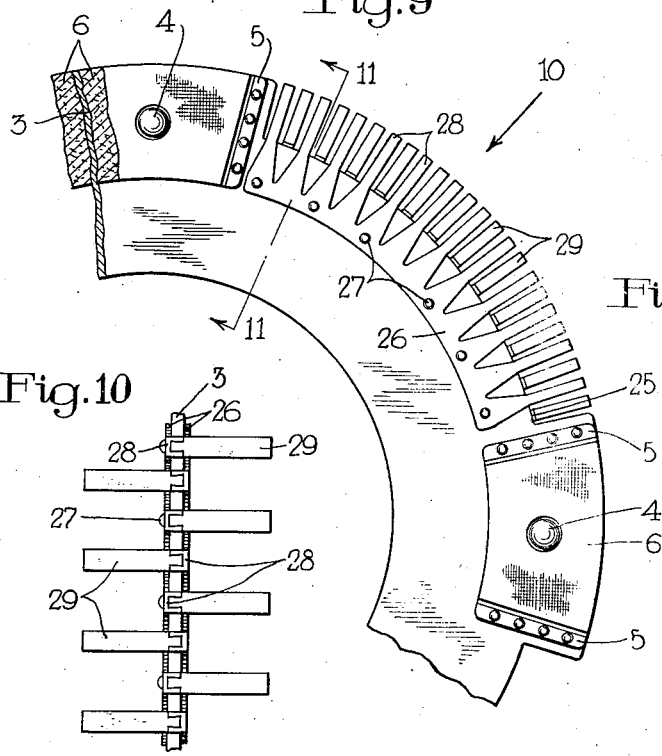
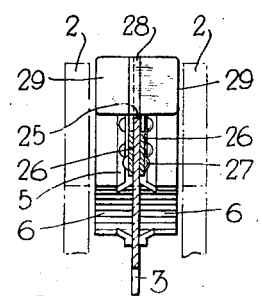
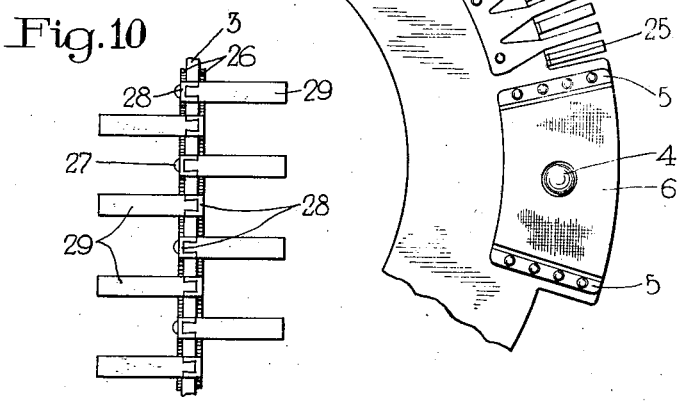
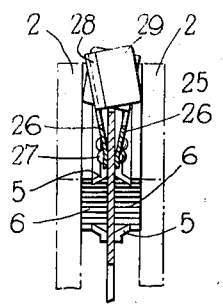
INVENTOR
Joseph C. McCune
BY
ATTORNEY Patented Aug. 17, 1943

2,326,961

UNITED STATES PATENT OFFICE 2,326,961

BRAKE MECHANISM

Joseph C. McCune, Edgewood, Pa., assignor to The Westinghouse Air Brake Company, Wilmerding, Pa., a corporation of Pennsylvania Application December 20, 1941, Serial No. 423,825

17 Claims. (Cl. 188—218)

This invention relates to brake mechanism and more particularly to the disk type embodying rotatable ring-like disks or rotors and non-rotatable stators adapted upon frictional interengagement to effect braking of a rotatable member.

In Patent 2,238,943 issued on April 22, 1941, to Joseph C. McCune and George K. Newell there is disclosed a disk brake mechanism of the above type in which both the rotors and stators are made of metal, and metal to metal frictional contact between these parts produces braking.

Composition braking material, such as in general use in the brakes of automobiles etc., is capable of providing a greater degree of friction and thus a greater degree of braking, per unit area, when in contact with metal than is obtainable by contact between metal and metal as in the construction disclosed in the above patent. It therefore follows that to obtain a certain degree of braking torque, a brake having composition braking material for frictionally contacting metal may be smaller in size and lighter in weight, and may have less braking surface and possibly fewer braking discs than required for a brake such as disclosed in the above patent.

However, with either of the above types of brake structure, the energy required to produce a certain degree of braking is the same and the transformation of this energy into heat would tend to result in a greater concentration in or a greater degree of heating of the composition braking material of the one brake, due to the fact that the braking area would be less than in the metal to metal type brake. Excess heating of composition braking material however results in rapid disintegration, burning or wearing away of the material and must be avoided.

One object of the invention is therefore the provision for a disk brake mechanism of a brake rotor having a friction brake surface of composition braking material and also having improved means for dissipating heat from the element so as to prevent excessive heating of the composition braking material during braking.

Another object of the invention is the provision of a ring-like disk or rotor for a disk brake mechanism, which rotor is provided with composition braking material for frictional contact with a brake stator to produce braking and also with non-braking means for at the same time engaging said stator but only to act as a fan means for creating a forced flow of air around the braking material and over the braking surface of said stator to prevent excessive and damaging heating of said braking material.

Another object of the invention is the provision of a rotor such as just defined in which the braking surface or braking area of the composition braking material is limited in accordance with the heat dissipating capacity of the non-braking means, and is distributed over a plurality of separate and relatively small brake shoes arranged around the disk in spaced relation to each other in order to expose a relatively large area of the braking material to the circulating air currents to thus facilitate the dissipation of heat therefrom.

Other objects and advantages will be apparent from the following more detailed description of the invention.

Figure 2:
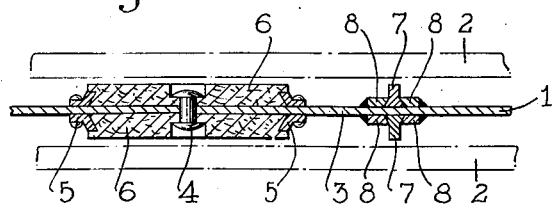
Figure 3:
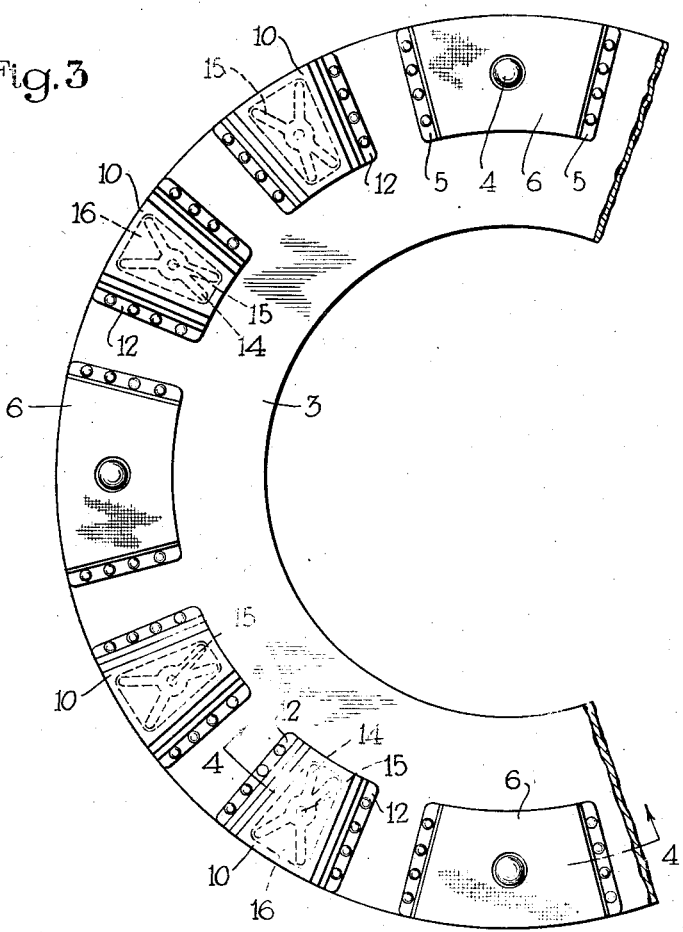
Figure 4:
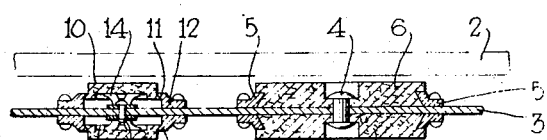
Figure 5:
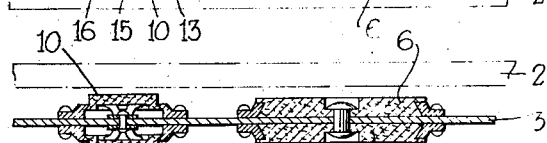
Figure 6:
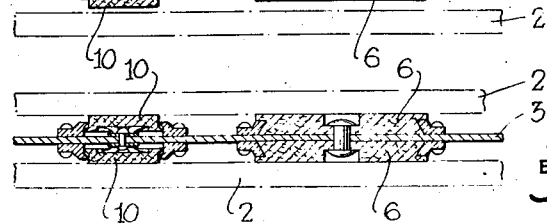

In the accompanying drawings; Fig. 1 is a plan or end view of a rotor for a disk brake mechanism, constructed in accordance with one embodiment of the invention; Fig. 2 is a sectional view taken on the line 2—2 in Fig. 1; Fig. 3 is a plan view of a portion of a brake rotor constructed in accordance with another embodiment of the invention; Fig. 4 is a sectional view taken on the line 4—4 in Fig. 3; Figs. 5 and 6 are views similar to Fig. 4 but with the parts in different conditions; Fig. 7 is a view similar to Fig. 3 but showing still another form of the invention; Fig. 8 is a sectional view at an enlarged scale taken on the line 8—8 in Fig. 7; Fig. 9 is a view similar to Fig. 7 showing still another form of the invention; Fig. 10 is an edge view at an enlarged scale of the rotor shown in Fig. 9 looking in the direction of arrow 10; Fig. 11 is a sectional view taken on the line 11—11 in Fig. 9; and Fig. 12 is a view similar to Fig. 11 but with the parts in a different position.

General description

As is well known, a rotor of a disk brake mechanism is adapted to be secured to turn with a wheel of a vehicle or any other rotatable member which it is desired to brake, while a stator is adapted to be fixed against rotation. There may be any number of rotors and stators in a brake, interleaved with each other, and a rotor may be positioned at either one end or the other of a pile of brake elements and therefore have only one braking face or it may be arranged between two stators and be provided with two braking faces. Interengagement between the adjacent faces of the rotors and stators will provide braking of the rotor or rotors and thereby of the wheel or member to which the rotor or rotors is secured and which it is desired to brake. A structure of this general type is disclosed in the McCune et al. patent hereinbefore referred to and to which reference may be made. In view of these facts and also the fact that disk brakes in general are so well known, the showing of the invention in the drawings has been limited and the following description thereof will also be limited to only that which is deemed necessary to a clear and comprehensive understanding of the invention.

Description—Figures 1 and 2

In the embodiment of the invention shown in Figs. 1 and 2, the reference numeral 1 indicates a rotor of a disk brake mechanism which, for the purpose of illustration only, is of the type adapted to be interposed between two preferably metal brake stators 2 (Fig. 2) the adjacent metal faces of which are adapted to cooperate with the opposite faces of said rotor to effect braking of a wheel or other member (not shown) to which the rotor is adapted to be secured, and which it is desired to brake.

The rotor 1 constructed in accordance with this embodiment of the invention comprises a central ring 3 which is preferably made of sheet metal. Secured to each of the opposite faces of this ring in any suitable manner, as by rivets 4 and clips 5, are a plurality of oppositely disposed arcuate shaped brake shoes 6. These shoes are preferably made of composition type of brake material and their outer faces provide friction braking surfaces for frictional braking contact with the adjacent metal faces of stators 2.

The brake shoes 6 are equally spaced from each other around each side of the ring and the total arcuate length and area of the braking faces or surfaces of the shoes on each side of the ring equals substantially one third the length and area of the circular surface of the ring between circles including the inner and outer peripheral edges of the shoes. This area is considered substantially the maximum which is capable of use with the heat dissipating or cooling means to be described. In other words, this area of braking surface on each side of the rotor will produce an amount of heat during braking contact with stators 2 which equals substantially the heat dissipating capacity of the cooling means to prevent excessive and damaging heating of the shoes.

As shown in the drawing and above described the braking surface on each side of the rotor is divided up between several brake shoes, such as 4 in number, in order that a relatively large area of the shoes will be subjected to the cooling action of air currents created by the cooling means to thus facilitate the dissipation of heat and also to minimize the possibility of development of excessive heat in areas within the shoes remote from contact with the air currents around the shoes.

Between each two brake shoes 6 on each side of the rotor 3 there is provided a heat dissipating means comprising one or more radially extending non-braking elements or fan blades 7 which at one side of the ring 3 may be arranged opposite those at the opposite side of the ring (Fig. 2). Each of the blades 7 is secured in position by a clip 8 which may be welded to the ring 3. The blades 7 extend from the side of the ring 3 substantially the same distance as the brake shoes 6 so that upon braking engagement between said shoes and the stators 2, said blades will engage, or substantially so, the braking faces of the stators so to thereby form between each adjacent pair of blades and between each shoe 6 and the adjacent blade 7, a radial duct open at both its inner and outer ends to the atmosphere. With the rotor 1 rotating and in braking contact with the stators 2, the ends of the brake shoes 6 and the sides of the blade 7 will therefore act as fan blades to create a forced flow of air through these ducts over the ends of said shoes and the portions of the braking face of the stators between the shoes for carrying away heat from said shoes and stators incident to such braking contact. As above described, the area of the braking faces of the shoes 6 is limited in accordance with the heat dissipating capacity of the cooling means just described so as to avoid excessive and damaging heating of the shoes 6 during braking.

As above mentioned, the blades 7 are non-braking elements and provided to act merely as fan elements. Braking is limited to the brake shoes 6. In order to thus limit braking to the shoes 6, the blades 7 are made of a material which upon contact with the stators 2 will readily wear away or turn over as the shoes 6 wear, without producing any material degree of resistance to rotation of the rotor. This material may be a relatively soft metal, such as copper or aluminum, the melting point of which is above the temperature which the rotor will obtain during braking, or the material may be composition braking material, like the shoes 6, but in the form of relatively thin strips and thereby capable of bending or turning over under rubbing contact with the stators 2 so as to prevent any material degree of drag on the rotor. Any of these materials will attain the same end, and the degree of braking will be limited substantially to the surface of shoes 6 provided for contact with the stators 2, as will be apparent.

It is desired to point out that applicant is aware it is old to provide a rotor having a plurality of brake shoes separated from each other by relatively narrow spaces through which cooling air currents may flow. For the purpose of braking vehicles like those used in railway service such known structures are impractical however, particularly where composition braking material is used, for the reason that excessive and damaging heating of the composition brake material cannot be avoided. Applicant has solved this problem however by the provision of a rotor having both braking means and non-braking means and by limiting the braking surface of the braking means to an amount which will produce no more heat than the fan action of the non-braking means can dissipate to prevent damage to the braking means or brake shoes. This improved structure is believed to be new and an important contribution to the art since it provides for the successful use of composition brake material in this type of brake.

Description—Figures 3 to 6

According to this embodiment of the invention one or more fan blades 10 is secured to rotor ring 3 between each two brake shoes 6. Each blade 10 may be of any desired arcuate length and along each of its opposite ends at the side adjacent the ring 3, there is provided an outwardly and radially extending shoulder 11. A clip 12, secured to the ring 3 at each of the opposite ends of each blade 10, has a shoulder 13 overlapping the adjacent shoulder 11 on the blade whereby the blade is movable relative to the clips 12 either in the direction of the ring 3 or in the opposite direction as limited by contact with the shoulders 13.

Between the clips 12 at the ends of each blade 10, a spring 14, substantially in the shape of a cross, is secured at its center to the ring 3 by a rivet 15. The ends of the spring under each blade 10 act against the inner face of the blade within a recess 16 for urging the blade in a direction away from the ring 3.

Each blade 10 is adapted to be applied between the respective pair of clips 12 by inserting from the outer periphery of the ring 3, and after being thus positioned the interengagement of the spring 14 with the blade within the recess 16 is adapted to hold the blade in position in the rotor.

The blades 10 may be made of any desired material, since under no condition are said blades adapted to engage the stators 2 with such force as to create any appreciable resistance to rotation of the rotor.

When the shoes 6 are new, it is intended that with the shoulders 11 on the blades in contact with shoulders 13 on the clips 12 the outer surface of the blades 10 will be in substantial alignment with the braking faces of said shoes, so that when the stators 2 are in braking contact with the shoes the blades will be in substantial contact with the stators to create a forced flow of air through radially extending channels formed between the blades and stators for dissipating heat from the rotor and stators.

After the brake shoes 6 become worn and when disengaged from the stators 2, the blades 10 will project from the ring 3 to a degree greater than shoes 6 according to the extent of wear of said shoes, as shown in Fig. 5. When this condition exists, then when the stators are moved into contact with the shoes 6, said stators will engage and move the blades 10 inwardly of the clips 12 in the direction of ring 3 to a position such as shown in Fig. 6. In this position it will be noted that the blades 10 are held in contact with the stators by the relatively light force of springs 14, this force being insufficient however to provide any appreciable degree of resistance to rotation of the rotor.

It will thus be seen that when the shoes 6 are new, if the braking surfaces thereof are in line with the ends of blades 10 said blades will merely substantially engage the stators 2 during braking, and after the shoes 6 wear, the force between the blades 10 and stators 2 during braking will be limited by springs 14 to a degree which will not materially retard rotation of the rotor. The degree of braking of rotor 1 by stators 2 will therefore be limited in accordance with the area of braking surface of the several brake shoes 6 and be substantially independent of the blades 10. The blades 10 therefore constitute non-braking elements, the only purpose of which is to create a forced circulation of air around the brake shoes and over the surface of the stators between said shoes for carrying away heat incident to braking and thus prevent damage to said shoes.

It will be noted that after the shoes 6 become worn, the blades 10 will, with the brakes released, extend substantially the same distance from ring 3 as when the shoes 6 are new and will therefore provide for substantially as prompt cooling of the parts of the brake when released subsequent to an application as obtained when the shoes 6 are new.

Description—Figures 7 and 8

In this embodiment there is provided between each two brake shoes 6 an arcuate shaped plate 20 which has on its outer face a plurality of outwardly projecting fan blades 21 extending radially of the plate. These blades may be made of any desired material and are provided only for non-braking engagement with the adjacent stator 2 upon engagement thereof with the brake shoes 6 on the ring 3.

At the inner and outer edge of each plate 20 a clip 22 is secured to the central ring 3 by rivets 19 and overlaps the adjacent peripherial edge of the plate for limiting movement thereof in a direction away from ring 3. Each plate may be held against endwise movement by strips 24 extending between and connecting the radially aligned ends of the clips 22. With the plates 20 in their outermost positions defined by interengagement of the plates with the clips 22, the ends of the blades 21 are intended to be aligned with the braking surfaces of shoes 6, when the shoes are new, so as to just substantially engage the stators 2 upon braking engagement between the shoes 6 and said stators.

Between each two oppositely arranged pair of plates 20 the central ring 3 is provided with a plurality of bores which are spaced from each other, and extending through each of these bores and engaging the oppositely arranged plates 20 is a coil spring 23. These springs 23 act in the same capacity as springs 14 in the embodiment shown in Figs. 3 to 6, to urge the fan blades 21 outwardly in the direction of the respective stators 2 and to provide, under light pressure from the stators, for movement of the plates 20 and blades 21 in the direction of the central ring 3, as the brake shoes 6 wear away. The pressure of the springs 23 on the plates 20 is merely sufficient to accomplish the end just described, so that during braking there will be no appreciable degree of drag on or resistance to rotation of the rotor upon contact between the blades 21 and stators 2, whereby these blades will function during braking only to create a forced flow of air between the blades and around the shoes to avoid excessive heating of the shoes.

Description—Figures 9 to 12

In this embodiment the rotor ring 3 is provided between each two shoes 6 with an arcuate shaped notch extending substantially from one shoe to the next and from the outer periphery of the ring to a line 25 located substantially midway between circles including the outer and inner peripheral edges of the shoes 6. At both sides of ring 3 a relatively narrow arcuate shaped plate 26 is disposed between each two adjacent pair of shoes substantially in line with the inner peripheral edge of the shoes and is secured to said ring by rivets 27.

Each plate 26 has a plurality of spaced spring fingers 28 projecting radially therefrom and terminating in line with the outer periphery of the shoes 6, the fingers 28 at one side of the rotor ring 3 being aligned with the spaces between the fingers 28 of the plate 26 at the opposite side of ring 3.

A substantially rectangular shaped and radially arranged fan blade 29 is secured at one end to the inner surface of each finger 28 and projects therefrom through the notch in the ring and beyond the opposite side thereof, it being noted in Fig. 11 that the blades 29 projecting beyond one side of ring 3 are secured to fingers 28 projecting from the plate 26 at the opposite side of the ring 3.

Engagement between the fingers 28 and the ring 3, inside of the line 25 (Fig. 11), is adapted to define the normal or brake release position of the blades 29. When in this position it is intended that the ends of the blades opposite those secured to fingers 28 will substantially line up with the braking surfaces of shoes 6 when said shoes are new so as to just substantially engage the stators 2 during braking to create a forced circulation of air between the rotor and stators in the same manner as described in connection with the embodiments shown in Figs. 3 to 8.

As the brake shoes 6 wear away however and the stators 6 therefore move closer to each other to obtain braking contact with said shoes, it will be seen that pressure of the stators against blades 29 will cause said blades to move inwardly as permitted by the resiliency of the supporting fingers 28, the force of these fingers being only sufficient however to provide such light contact between the blades and stators under this condition that there will be no material degree of drag of said blades on the stators. In Fig. 12 the blades 29 are shown in a position which will be assumed when the brakes are applied, after wear of the brake shoes 6 has taken place.

Upon release of the stators from the brake shoes 6 after the shoes have become worn the resiliency of fingers 28 will return the blades 29 from a position such as shown in Fig. 12 to the position shown in Fig. 11, so as to create substantially the same degree of air circulation with the brake shoes worn as when new, for cooling the brake elements in a minimum of time upon release operation thereof, the same as provided for by the arrangements shown in Figs. 3 to 8.

Summary

It will now be noted that a rotor for a disk brake mechanism has been provided in which braking is adapted to be effected by the interengagement of brake shoes, made of composition brake material, with metal, and that the braking area or surface of the brake shoes on one side of the rotor is limited in accordance with the heat dissipating capacity of the cooling means in order to prevent excessive heating and damaging of said shoes.

In all embodiments of the invention the heat dissipating fan blades contact the stators during braking but these fan blades are non-braking elements and not adapted to effect braking, their only function being to act as fan means for forcing air currents around the brake shoes 6 and over the braking surface of the stators between said shoes.

The fan blades may be either a non-resiliently supported type such as shown in Figs. 1 and 2, or a resiliently supported type shown in Figs. 7 to 12. The non-resiliently supported type of fan blade is preferably made relatively thin and of a material which will quickly wear away or turn over under light pressure from the stators in order to avoid obtaining any appreciable resistance to rotation of the rotor. The resiliently supported fan blades may however be made of any desired material since the pressure between said blades and the stators during braking is so limited by the actuating springs as to prevent any material degree of resistance to rotation of the rotor. The resiliently supported fan blades may have a relatively great arcuate length, as shown in Figs. 3 to 6, as compared to the relatively narrow blades 7 shown in Figs. 1 or 2, or may be relatively narrow and be provided in greater numbers as shown in Figs. 7 to 12, in order to attain a desired circulation of air between the rotor and stators.

Having now described my invention, what I claim as new and desire to secure by Letters Patent, is:

1. An annular brake rotor for a disk brake mechanism of the type having an annular stator disposed in coaxial relation with said rotor and in which engagement between said rotor and said stator is adapted to effect braking of said rotor, said rotor comprising in combination a ring, a brake shoe of composition braking material secured to one side of said ring and adapted to frictionally engage the adjacent face of said stator to brake said rotor, and non-braking means carried by said ring and spaced from said shoe and projecting from said ring for contact with said stator upon engagement of said shoe and stator and operative upon rotation of said rotor to force air around said shoe and over the braking surface of said stator beyond the ends of said shoe.

2. A disk brake mechanism comprising in combination a brake stator, a coaxially arranged brake rotor comprising a ring, a plurality of brake shoes of composition braking material spaced from each other around one side of said ring and secured thereto for frictionally engaging the adjacent face of said stator to brake said rotor, and a plurality of non-braking means arranged around and secured to said rotor between said brake shoes and operative upon rotation of said rotor to force air around said shoes and over the braking surface of said stator between said shoes, said non-braking means constituting fan blades arranged radially of the rotor and projecting from said one face for contact with said stator upon contact of said brake shoes with said stator.

3. A rotor for a brake mechanism comprising in combination a ring, a plurality of brake shoes spaced from each other around and secured to one face of said ring, and a plurality of non-braking means arranged around said ring between said shoes and projecting from said face of said ring a distance equal substantially to the thickness of said shoes.

4. A rotor for a brake mechanism comprising in combination a ring, a plurality of brake shoes spaced from each other around and secured to one face of said ring, a plurality of non-braking elements arranged around said ring between said shoes and having generally radially extending surfaces adapted to act as fan blades upon rotation of said rotor, said elements being capable of movement in directions away from and toward said face of said ring, means associated with said ring arranged to limit movement of said elements away from said ring to positions in which the outer ends of said elements are in a plane including the surfaces of said brake shoes most remote from said ring when said shoes are new, and spring means acting on said elements urging same in a direction away from said ring and providing for movement of said elements in the direction of said ring.

5. In combination, a brake stator, an annular coaxially arranged brake rotor comprising a ring, a plurality of brake shoes spaced around and secured to one face of said ring for frictional contact with said stator to effect braking of said rotor, and a plurality of non-braking elements arranged around said ring between said shoes and secured to said ring and operative upon rotation of said rotor to create a forced circulation of air around said shoes and over the adjacent surface of said stator between said shoes for dissipating heat from said shoes, each of said non-braking elements constituting a fan blade extending in a generally radial direction across the said face of said ring and projecting from said face a distance substantially equal to the thickness of said brake shoes and being relatively thin as compared to the arcuate length of said shoes and incapable of providing any material degree of resistance to rotation of said rotor upon contact with said stator.

6. A brake rotor for a disk brake mechanism of the type having a coaxially arranged brake stator, said rotor comprising in combination a ring, a plurality of brake shoes made of composition braking material spaced from each other around and secured to one face of said rotor for frictional contact with the adjacent face of said stator to brake said rotor, and a plurality of fan blades arranged around said rotor and secured to said one face between said shoes, said blades extending in a generally radial direction of said ring and projecting from said one face for contact with said stator upon engagement of said brake shoes with said stator, said fan blades being relatively thin and made of material adapted to wear away under contact with said stator without effecting any material resistance to rotation of said rotor.

7. A brake rotor for frictional braking contact by a coaxially arranged brake stator of a disk brake mechanism, said rotor comprising in combination a ring, a plurality of arcuate brake shoes of composition braking material spaced from each other around and secured to said ring for frictional contact with said stator to effect braking of said rotor, and a plurality of non-braking metal elements spaced from each other around said ring between said shoes and secured to said ring, said non-braking elements extending in a generally radial direction of said ring and projecting therefrom a distance equal substantially to the thickness of said shoes and adapted to act as fan blades upon rotation of said rotor to create a circulation of air past the ends of said shoes and over the surface of said stator between said shoes, the metal of said non-braking elements upon contact with said stator being capable of wear without effecting any material resistance to rotation of said rotor.

8. A brake rotor for frictional braking contact with a coaxially arranged brake stator of a disk brake mechanism to effect braking of said rotor, said rotor comprising, in combination, a ring, a plurality of brake shoes of composition braking material spaced from each other around and secured to one face of said ring for frictional braking engagement with said stator, and a plurality of non-braking elements spaced from each other around said face of said ring between said brake shoes and secured to said ring, said non-braking elements extending in a generally radial direction of said ring and being resiliently urged into contact with said stator upon engagement of said stator and brake shoes and operative upon rotation of said rotor to act as fan blades to create a circulation of air past the ends of said shoes and over the face of said stator between said shoes.

9. A brake rotor for frictional braking contact with a coaxially arranged brake stator of a disk brake mechanism to effect braking of said rotor, said rotor comprising in combination a ring, a plurality of arcuate brake shoes of composition braking material spaced from each other around and secured to one face of said ring, for frictional braking contact with said rotor, the combined arcuate length of said shoes being equal substantially to one third the length of the circular surface of said ring between the inner and outer peripheral edges of said shoes, and fan means between each adjacent pair of said shoes secured to said face of said ring and extending across said face in a generally radial direction and projecting from said face a distance equal substantially to the thickness of said shoes for non-braking contact with said stator to effect a circulation of air past the ends of said shoes and over the face of said stator between said shoes upon rotation of said rotor.

10. A brake rotor for frictional braking contact with a coaxially arranged brake stator of a disk brake mechanism to effect braking of said rotor, said rotor comprising in combination a ring, a plurality of arcuate brake shoes of composition braking material spaced from each other around and secured to one face of said ring for frictional braking contact with said stator, the combined arcuate length of all of said brake shoes equaling substantially one third the length of the circular surface of said ring between the inner and outer peripheral edges of said shoes, and a plurality of non-braking metal fan blades disposed between each adjacent pair of said shoes and operative upon rotation of said rotor to effect a circulation of air past the ends of said shoes and over the surface of said stator between said shoes, said blades being spaced from each other and the adjacent ends of said shoes and having a length equal substantially to the radial width of said shoes and extending from said face of said ring a distance equal substantially to the thickness of said shoes for contact with said stator upon contact between said stator and shoes, the width of each of said blades being such as to provide for wear of the blades upon contact with said stator without effecting any material degree of resistance to rotation of said rotor.

11. A brake rotor for frictional braking contact with a coaxially arranged brake stator of a disk brake mechanism to effect braking of said rotor, said rotor comprising in combination a ring, a plurality of brake shoes of composition braking material spaced from each other around and secured to one face of said ring for contacting said stator, and a plurality of fan blades carried by said one face of said ring between said shoes and resiliently urged in a direction away from said face for contact with said stator upon braking engagement of said stator and brake shoes to effect a circulation of air around said shoes and over the braking face of said stator between said shoes.

12. A brake rotor for frictional braking contact with a coaxially arranged brake stator of a disk brake mechanism to effect braking of said rotor, said rotor comprising in combination a plurality of brake shoes of composition brake material spaced from each other around and secured to one face of said ring for frictional braking engagement by said stator, and a plurality of fan members spaced from each other around said one face of said ring between said shoes and secured to said ring for rotation therewith to effect a circulation of air around said shoes and over the face of said stator between said shoes, each of said fan members being capable of movement in a direction toward and away from said face of said ring and adapted to contact said stator upon engagement of said stator and shoes, and resilient means acting on each of said members urging same in a direction away from said ring.

13. A brake rotor for frictional braking contact with a coaxially arranged brake stator of a disk brake mechanism to effect braking of said rotor, said rotor comprising in combination a plurality of brake shoes of composition brake material spaced from each other around, and secured to one face of said ring for frictional braking engagement by said stator, and a plurality of fan members spaced from each other around said one face of said ring between said shoes and secured to said ring for rotation therewith to effect a circulation of air around said shoes and over the face of said stator between said shoes, each of said members comprising an element having oppositely disposed surfaces extending radially of the rotor and parallel to its axis to act as fan blades upon rotation of said rotor, means securing said element to said ring for rotation therewith and providing for movement of said element in a direction toward and away from said ring, and spring means acting on said element for urging same in a direction away from said ring into contact with said stator upon engagement of said stator and shoes.

14. A brake rotor for frictional braking contact with a coaxially arranged brake stator of a disk brake mechanism to effect braking of said rotor, said rotor comprising in combination a plurality of brake shoes of composition brake material spaced from each other around and secured to one face of said ring for frictional braking engagement by said stator, and a plurality of fan members spaced from each other around said one face of said ring between said shoes and secured to said ring for rotation therewith to effect a circulation of air around said shoes and over the face of said stator between said shoes, each of said members having radially extending faces operative upon rotation of said rotor to effect a flow of air outwardly of said rotor, means secured to said ring and connected with each member for rotating said member with said ring and providing for movement of said member in a direction toward and away from said ring, and spring means carried by said ring acting on each of said members for resiliently urging same into non-braking contact with said stator and brake shoes.

15. A brake rotor for frictional braking contact with a coaxially arranged brake stator of a disk brake mechanism to effect braking of said rotor, said rotor comprising in combination a plurality of brake shoes of composition brake material spaced from each other around and secured to one face of said ring for frictional braking engagement by said stator, and a plurality of fan members spaced from each other around said one face of said ring between said shoes and secured to said ring for rotation therewith to effect a circulation of air around said shoes and over the face of said stator between said shoes, each of said members comprising an arcuate shaped element disposed between each adjacent pair of said shoes, a plurality of fan blades associated with said element and extending in a generally radial direction of said ring and projecting from said element for contact with said stator, upon contact of said shoes and stator, means securing said element and blades to said ring for rotation therewith and providing for movement of said element and blades in a direction toward and away from said ring, and resilient means acting on said element for moving same and said blades in a direction away from said ring, said resilient means governing the non-braking pressure between said blades and stator upon braking engagement between said stator and shoes, as said shoes wear away.

16. A rotor for frictional braking contact with a coaxially arranged brake stator of a disk brake mechanism to effect braking of said rotor, said rotor comprising in combination a ring, a plurality of brake shoes of composition brake material spaced from each other around and secured to one face of said ring for frictional braking contact with said stator, and means between each adjacent pair of said shoes adapted to effect an outward circulation of air past the ends of said shoes and the face of said stator, between said shoes upon rotation of said rotor, said means comprising a resilient radially extending finger secured at its inner end to said ring, and a fan blade extending generally radially of said ring and parallel to its axis and secured to said finger and arranged to contact said stator upon engagement of said stator and shoes, for creating a forced outward flow of air around one of said shoes and over the braking face of said stator adjacent said one shoe upon rotation of said rotor.

17. A brake rotor for frictional braking contact with a coaxially arranged brake stator of a disk brake mechanism to effect braking of said rotor, said rotor comprising in combination a ring, a plurality of brake shoes of composition brake material spaced from each other around and secured to one side of said ring for frictional braking contact with said stator, said ring having between each adjacent pair of brake shoes a notch opening at the outer peripheral edge of the ring and extending in the direction of the inner peripheral edge, a plurality of fan blades spaced from each other extending through said notch in a generally radial direction of the ring and parallel to the axis thereof, a plurality of resilient fingers secured to said ring in spaced relation, means securing each of said blades to one of said fingers, the ends of said blades opposite the supporting fingers being substantially aligned with the braking face of said shoes upon disengagement of said stator from said shoes when said shoes are new, said fingers being operative upon wear of said shoes to resiliently urge said blades against said stator, said blades upon rotation of said rotor being operative to create a forced circulation of air past the ends of said shoes and over the braking face of said stator.

JOSEPH C. McCUNE.